United States Patent [19]

Rosman et al.

[11] Patent Number: 4,538,749
[45] Date of Patent: Sep. 3, 1985

[54] NON-CIRCULAR ROLLING DIAPHRAGM LIQUID EXPULSION APPARATUS

[75] Inventors: Irwin E. Rosman, Woodland Hills; David L. Leonard, Canoga Park, both of Calif.

[73] Assignee: Rockwell International Corporation, El Segundo, Calif.

[21] Appl. No.: 562,497

[22] Filed: Dec. 15, 1983

Related U.S. Application Data

[63] Continuation-in-part of Ser. No. 282,551, Jul. 13, 1981, abandoned.

[51] Int. Cl.³ .............................................. B67D 5/54
[52] U.S. Cl. ................................. 222/386.5; 60/39.48
[58] Field of Search ................... 60/39.48, 259, 39.1; 222/386.5, 95, 389

[56] References Cited

U.S. PATENT DOCUMENTS

| | | | |
|---|---|---|---|
| 3,668,868 | 6/1972 | Drzycki | 60/39.48 X |
| 3,722,751 | 3/1973 | Bisciglia | 222/95 X |
| 3,847,307 | 11/1974 | Hoser | 222/386.5 |
| 3,847,308 | 11/1974 | Tambor | 222/386.5 |
| 3,847,309 | 11/1974 | Grossman | 222/386.5 |
| 3,940,031 | 2/1976 | Fishman | 222/386.5 |
| 3,944,117 | 3/1976 | Gould | 222/95 |
| 4,129,025 | 12/1978 | Carey et al. | 72/348 |
| 4,216,881 | 8/1980 | Rosman | 222/95 X |
| 4,437,590 | 3/1984 | LaBruna | 60/39.48 X |

*Primary Examiner*—Carlton R. Croyle
*Assistant Examiner*—Jeffrey A. Simenauer
*Attorney, Agent, or Firm*—H. Fredrick Hamann; Harry B. Field

[57] ABSTRACT

A liquid expulsion apparatus 12 having a rolling diaphragm 20 conforming to the non-circular shape of the storage tank shelf 30, thereby increasing liquid storage capacity within the tank. A gas-driven piston 24, also conforming to the non-circular shape, expels the liquid in rapid fashion and provides the force for rolling the attached non-circular diaphragm 20. Stability in diaphragm 20 during actuation of piston 24 is maintained by varying the local thicknesses t of diaphragm 20 in relationship with the local, cross-sectional radii of curvature $R_c$.

4 Claims, 9 Drawing Figures

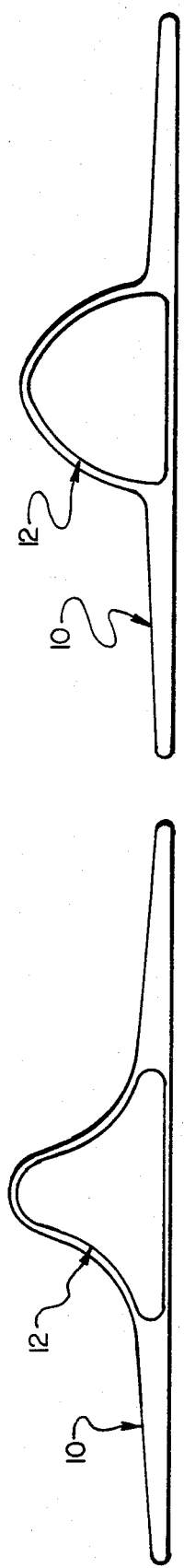
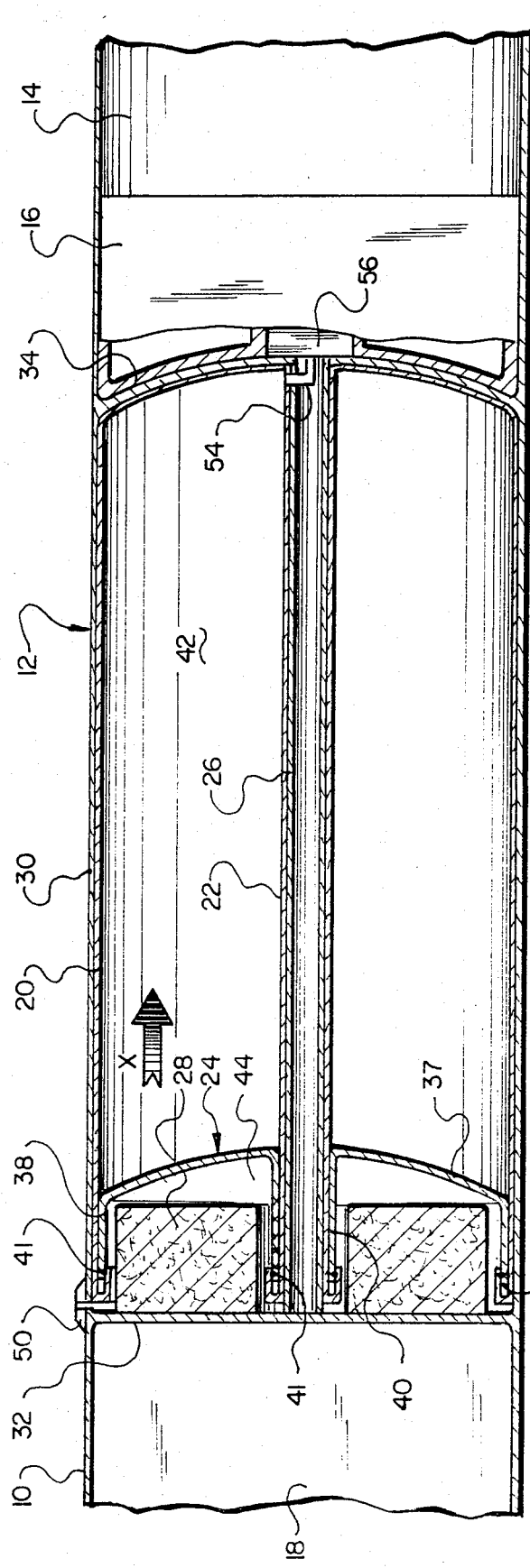
Fig.1. Fig.2. Fig.3.

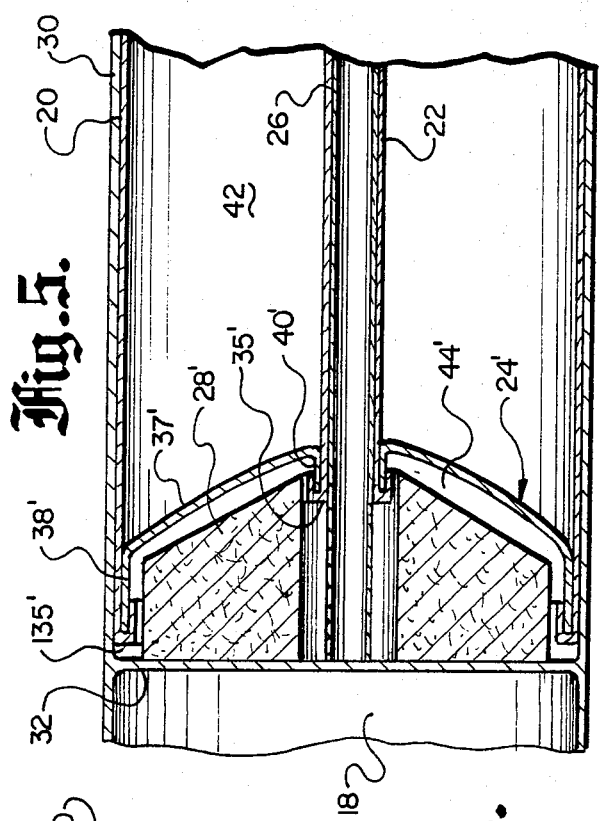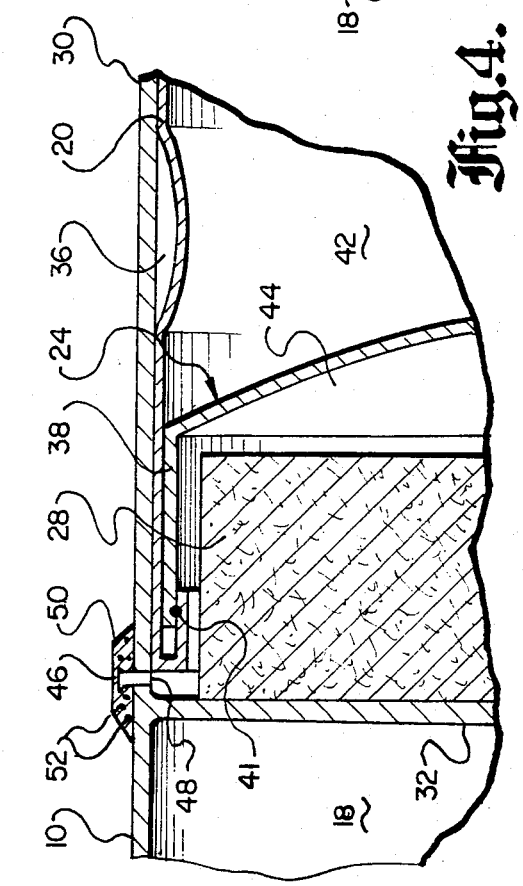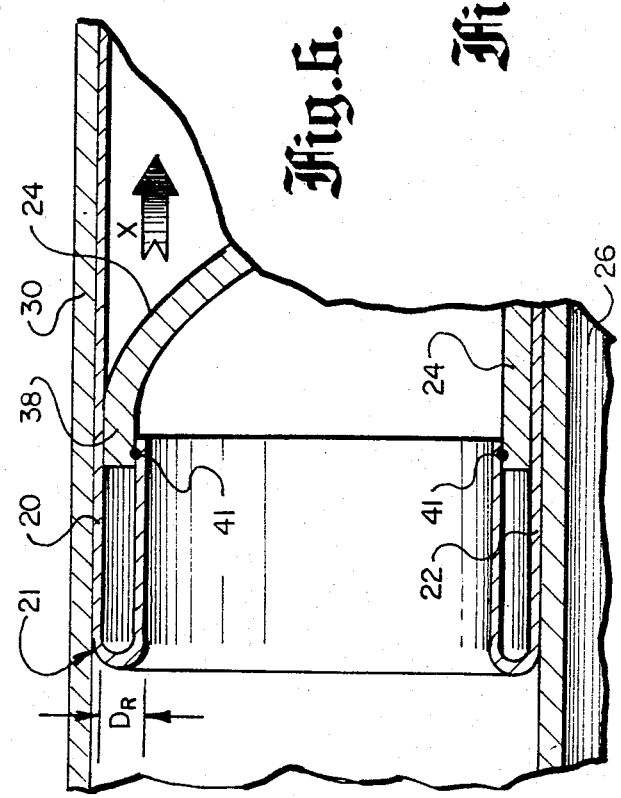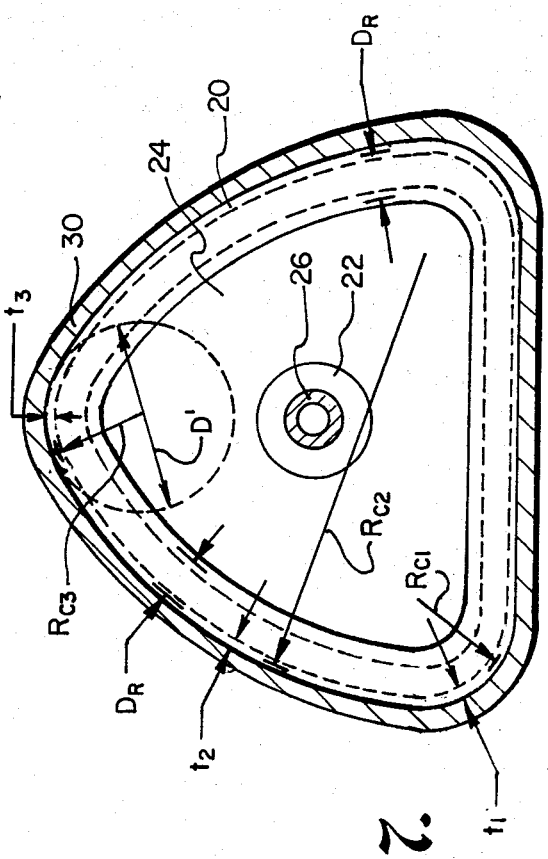

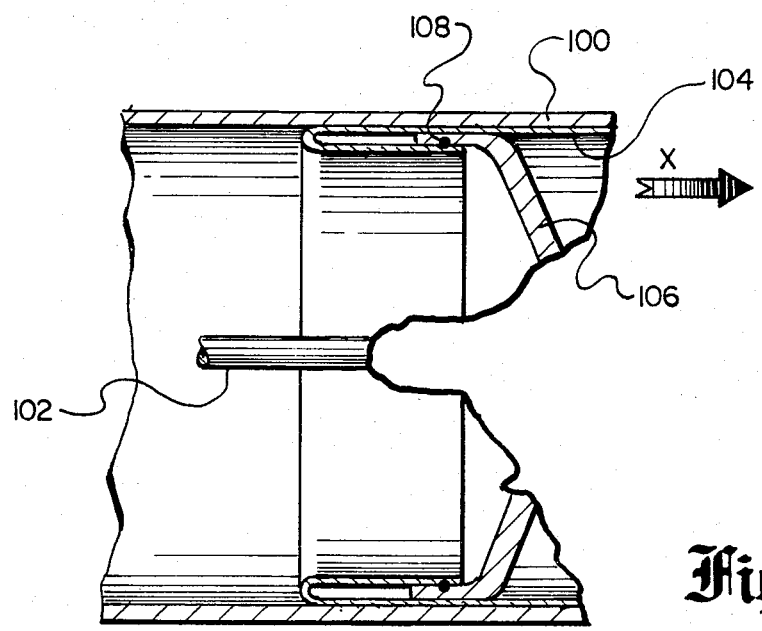
Fig.8.a.
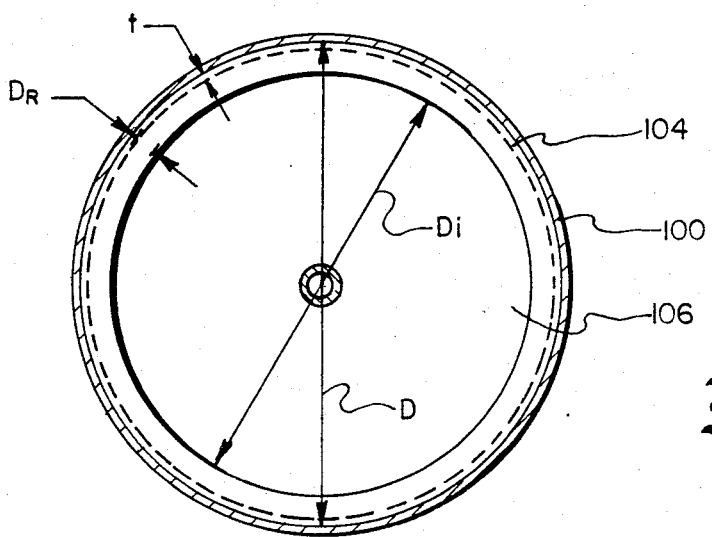
Fig.8.b.

NON-CIRCULAR ROLLING DIAPHRAGM LIQUID EXPULSION APPARATUS

This application is a continuation-in-part of copending application Ser. No. 282,551 filed July 13, 1981, now abandoned.

BACKGROUND OF THE INVENTION

1. Field of the Invention

The present invention relates to a liquid expulsion apparatus wherein a liquid or liquids are expelled out of a tank by a positive expulsion mechanism. More specifically, it relates to a non-circular liquid expulsion apparatus wherein a non-circular metal diaphragm containing the liquid is attached to a piston, the diaphragm rolling with piston movement preventing the liquid from leaking around the piston.

2. Description of the Prior Art

Liquid expulsion systems in which the liquid is stored in a tank for a long period of time and then rapidly discharged, such as in liquid rocket power plants, generally employ either pistons with rolling metal diaphragms or O-ring type seals, or collapsing metal diaphragms to provide expulsion of the liquid.

Pistons having seals present problems in eliminating leaks across the seal due to high pressure, irregularities in surface contour, and degradation of the elastomeric qualities of the seal. A circular rolling metal diaphragm combining with a circular piston to discharge the liquid was disclosed in U.S. Pat. No. 3,668,868. There, a single cylindrical outer diaphragm was bonded to the inside a cylindrical tank, the end of the diaphragm being attached to the piston head. The piston center support rod passed through a seal which is retained by a metal bulkhead separating two liquid storage chambers. The device is unsatisfactory in that liquid may migrate between the seal and the piston rod, and because of the tank's circular construction does not utilize all available volume inside a container which is non-circular.

A number of patents have issued that disclose collapsible bladders that expel liquids from a tank. For example, in U.S. Pat. No. 4,216,881, I described a geodesic, oblate spheroidally-shaped tank containing a reversible diaphragm, the shape of the diaphragm controlling the collapse mode as gaseous pressure is applied to the "dry" side. Other forms of collapsible diaphragms were disclosed in U.S. Pat. Nos. 3,504,827; 3,722,751; 3,404,813, and 3,339,803. Collapsing metal diaphragms usually present problems due to metal tearing and folding as well as improper collapsing due to uneven pressure points on the surface of the diaphragm.

OBJECTS OF THE PRESENT INVENTION

An object of the present invention is to provide a liquid expulsion system having a configuration that efficiently uses the space in which it is enclosed.

Another object of the present invention is to provide a liquid expulsion system wherein the liquid is expelled by a piston having rolling diaphragms acting as seals.

Yet another object of the present invention is to provide a non-circular liquid expulsion system.

Still another object of the present invention is to provide a non-leaking, piston driven liquid expulsion system in which piston head cocking is eliminated.

A further object of the present invention is to provide a liquid expulsion system wherein degradable dynamic seals are replaced by non-degradable metallic rolling diaphragms.

Other objects, advantages and novel features of the present invention will become apparent from the following detailed description of the invention when considered in conjunction with the accompanying drawing.

SUMMARY OF THE INVENTION

A liquid expulsion apparatus is disclosed for missile powerplants, having a tank, piston and diaphragms, all of non-circular shape for maximizing the liquid storage capacity. Missiles have been developed with cross-sectional shapes other than circular in order to decrease radar detectability and increase aerodynamic characteristics (i.e. wings). Conventional circular liquid expulsion systems fail to efficiently use all available space within the missile's frame thereby reducing the potential range or velocity of the missile.

An inner diaphragm bonded to a standpipe and an outer diaphragm bonded to a tank shell have their ends welded to the piston head. Gaseous pressure causes the piston to move along the tank shell. As the piston moves, the diaphragms separate from the bonding and fold over, or roll along, behind the piston, thereby sealing the liquid and preventing it from bypassing the piston. Stability in the diaphragms during actuation of the piston is maintained by varying the local thickness of the diaphragms in relationship with local radii of curvature.

BRIEF DESCRIPTION OF THE DRAWINGS

FIG. 1 is an end view diagram of a non-circular missile and diaphragm.

FIG. 2 is an end view diagram of a non-circular missile and diaphragm having a different cross-sectional shape.

FIG. 3 is a partial side view cross section of a missile having a non-circular rolling diaphragm liquid expulsion apparatus.

FIG. 4 is a partial side view cross section of the preferred embodiment.

FIG. 5 is a partial side view cross section of a second embodiment of the invention.

FIG. 6 is a side view diagram for defining the dimensions of a rolling diaphragm constructed according to the preferred embodiment of the present invention.

FIG. 7 is an end view diagram of the diaphragm shown in FIG. 6.

FIG. 8(a) is a partial side view of a cylindrical piston expulsion tank constructed according to the prior art.

FIG. 8(b) is an end view of the tank shown in FIG. 8(a).

DETAILED DESCRIPTION OF THE PREFERRED EMBODIMENTS

Liquid rockets, or missiles, sometimes employ a non-circular cross section tank, having at least two different radii of curvature, for mission effectiveness, as exemplified by the missile frame 10 outlined in FIG. 1. In order to more efficiently utilize the volume within the frame 10, a liquid expulsion apparatus 12 is also constructed of non-circular cross section. The apparatus 12 may be constructed in a variety of shapes and is not to be limited to a specific shape other than non-circular. A further example of the possible shape of the present invention is shown by the apparatus 12 of FIG. 2.

Describing the Rolling Diaphragm Liquid Expulsion Apparatus 12 in more detail while referring to FIG. 3, the missile frame 10 encloses a thrust chamber 14, an injector 16, and a warhead and electronics section 18. The apparatus 12 comprises an outer diaphragm 20, an inner diaphragm 22, a piston 24, a standpipe 26, a gas generator 28, and a tank shell 30. The tank shell 30 is constructed of a hard material, such as titanium, steel or aluminum, giving the apparatus 12 its non-circular shape. The tank shell 30 may be a separate entity within the frame 10 or it may be comprised by all or part of the frame 10. The tank shell 30 of the embodiment shown in FIG. 3, has a front tank bulkhead 32 and a rear tank bulkhead 34 integrally connected to the frame 10 which serves as the tank shell 30. Front and rear refer to the front and rear of the missile and are for reference only. The front, or nose, of the missile is to the left in FIG. 3.

The standpipe 26 is integrally connected to the front tank bulkhead 32 and rear tank bulkhead 34. The gas generator 28 is annular, encircling the standpipe 26. However, the standpipe 26 needs only to be rigidly connected to one of the bulkheads. If the standpipe 26 were to be connected only to the rear tank bulkhead 34, the gas generator need not be annular. The diaphragms 20 and 22 are preferably bonded to the tank shell 30 and standpipe 26, respectively, which prevents the gas from the generator 28 from entering between the tank 30 and the diaphragms 20 and 22 at their junctions 35. If gas from chamber 44 is allowed to leak between either of the diaphragms 20 and 22 and the tank shell 30 or standpipe 26, respectively, a gas pocket 36 is formed, causing the outer diaphragm 20 (See FIG. 4) to collapse or the inner diaphragm 22 to swell. This anomaly would cause the piston 24 to bind during operation. The diaphragms 20 and 22 may be one piece of material that conforms to the surface of the rear tank bulkhead 34 (as shown) or two separate pieces of material that terminate on the rear tank bulkhead 34. The diaphragms 20 and 22 are preferably fabricated of a thin ductile material such as 1100-0 annealed aluminum but they also can be constructed from materials such as steel or titanium.

The piston 24 is annular, light in weight, and moves along the standpipe 26. The outer peripheral shape of the piston 24 is substantially identical to the cross section of the tank shell 30; however, it is slightly smaller so as to be able to freely move along the standpipe 26 and tank shell 30. The piston 24 comprises an axial force receiving portion 37, an outer guide ring 38, and an inner guide ring 40. Either of the rings 38 and 40 are of sufficient length to stabilize the movement, thus preventing binding of the piston 24 as it moves along the standpipe 26. The inner guide ring 40 preferably extends past the gas generator 28 to the front tank bulkhead 32, increasing its length to diameter ratio. A second embodiment of a piston 24' for this invention is shown in FIG. 5. The force receiving portion 37' of piston 24' is angled from the outer diaphragm 20 to the inner diaphragm 22. Thus, the outer guide ring 38' is much closer to the front tank bulkhead 32 than the inner guide ring 40'. Both embodiments minimize angular forces on the diaphragms, thus greatly reducing the possibility of the piston 24 binding during movement. The piston 24 moves rearward towards bulkhead 34 between the diaphragms 20 and 22. The diaphragms 20 and 22 curve around the outer guide ring 38 and inner guide ring 40, respectively. The diaphragms 20 and 22 are permanently connected, for example, by a peripheral weld 41 to the outer guide ring 38 and inner guide ring 40, respectively, providing sealed, bonded joints.

The diaphragms 20 and 22, and piston 24 enclose the liquid propellant to annular cavity 42. The remaining area within the tank shell 30 (to the front of piston 24), is the gas chamber 44. The gas generator 28 is located within the gas chamber 44 and may comprise a grain for producing a gas when properly activated. A pressure relief valve 46 is located within an opening 48 in the side of tank 30, and is aerodynamically streamlined by cover 50 having vents 52. In operation, a signal is sent to the generator 28, producing a gas within chamber 44 and increasing the pressure and the resultant force against the piston 24. As the pressure of the gas becomes larger than the pressure of the liquid in cavity 42, the piston moves along standpipe 26 in the direction of the arrow designated "x" and forces the liquid out of the cavity 42 into the injector 16 via the duct 54 and the liquid release valve 56. The liquid release valve 56 preferably maintains a maximum liquid flow rate regardless of the force exerted by the piston 24. If the gas pressure in chamber 44 becomes excessive, the excess pressure is vented overboard by pressure relief valve 46.

Referring to FIG. 6, as piston 24 moves, diaphragms 20 and 22 roll outside-in and inside-out, respectively. By reason of its connection to guide ring 38 at 41, diaphragm 20 rolls up behind piston 24 as piston 24 is moved through tank shell 30. This rolling up or inversion of diaphragm 20 follows an arc designated 21 which is described by a rolling diameter $D_R$ as shown in FIGS. 6 and 7.

In FIGS. 8(a) and 8(b), there is shown a cylindrical tank shell 100 having a standpipe 102 and at least one diaphragm 104 set adjacent to tank shell 100. Diaphragm 104 is connected to piston 106 by a peripheral weld 108 which connection causes diaphragm 104 to roll up behind piston 106 as piston is caused to move along standpipe 102 in the direction of the arrow designated "x". For cylindrical tank shell 100, plastic strain energy theory and experimental testing have revealed and confirmed that:

$$C = \sqrt{\frac{D}{2t}} \tag{1}$$

where
C = rolling factor,
D = diameter of diaphragm, and
t = thickness of diaphragm,
and
$D_R = Ct$
where
$D_R$ = roll diameter
Multiplying both sides of equation (1) by t gives:

$$Ct = t\sqrt{\frac{D}{2t}} \text{ or } Ct = \sqrt{\frac{Dt}{2}}$$

and substituting $D_R$ from equation (2) gives $$D_R = \sqrt{\frac{Dt}{2}} \tag{3}$$

For cylindrical tank 100, the diameter of diaphragm 104 decreases during its inversion from D to $D_I$, thereby placing the diaphragm in hoop compression. Since D and t are uniform about the cross-section of cylindrical tank shell 100, the square root of their product, and therefore $D_R$, is the same at any point along the cross-section. This uniformity assures stability in diaphragm 104 as piston 106 is actuated.

However, in non-circular diaphragm 20 as shown in FIGS. 6 and 7, there is not a single diameter D as in the cylindrical case, but instead two or more radii of curvature $R_c$. Referring particularly to $R_{c3}$ in FIG. 7, each $R_c$ tends to cause non-circular diaphragm 20 to roll-up locally as though the subject peripheral location were a cylinder of a diameter D'.

Therefore, in order for non-circular diaphragm 20 in FIGS. 6 and 7 to roll without anomalies such as buckling or tearing, the local thicknesses t of non-circular diaphragm 20 must be varied with the respective local radii of curvature Rc to maintain a uniform roll diameter $D_R$ in accordance with equation (4) below which is derived from equation (2) by the substitution of ($2R_c$) for D:

$$D_R = \sqrt{R_c t} = K \text{ (constant)} \quad (4)$$

In other words, to maintain $D_R$ constant, as D, and therefore $R_c$, increases, t would be decreased. By maintaining a constant roll diameter $D_R$ in non-circular diaphragm 20, stability of the diaphragm under compression is maintained.

Referring to FIG. 7, non-circular tank shell 30 constructed according to the present invention has a cross-sectional shape described by several radii of curvature, e.g. $R_{c1}$, $R_{c2}$ and $R_{c3}$. In accordance with the relationship expressed in equation (4), $t_1$, $t_2$ and $t_3$ correspond with $R_{c1}$, $R_{c2}$ and $R_{c3}$ respectively, such that the dimension $D_R$ is kept at a uniformly constant value about the cross-section of tank shell 30. As shown in FIG. 7, the aforementioned relationship requires $t_1$ to be less than $t_2$, which in turn is greater than $t_3$, by reason of the similar comparative relationship between $R_{c1}$, $R_{c2}$ and $R_{c3}$. It is also to be understood that the relationship expressed in equation (3) is used for maintaining a uniform $D_R$ once a desired value for $D_R$ has been predetermined.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A missile frame having a cross-sectional shape defined by at least two different radii of curvature, wherein the capacity of said missile frame to contain a fluid is improved, said missile frame comprising a rolling diaphragm piston expulsion tank shell extending along at least a portion of the length of said missile frame and having a cross-sectional shape substantially conforming with at least a portion of said cross-sectional shape of said missile frame, said tank shell having a rolling diaphragm set adjacent to said tank shell and attached to a piston, said rolling diaphragm having local thicknesses t, all of said local thicknesses t being related by the following relationship:

$$D_R = \sqrt{R_c t} = K \text{ (constant)}$$

wherein $R_c$ is the local cross-sectional radii of curvature of said rolling diaphragm and $D_R$ is the rolling diameter of said rolling diaphragm, said rolling diameter being maintained at a uniform value K to assure stability in said rolling diaphragm during actuation of said piston.

2. A rolling diaphragm for use in a piston-expulsion tank having a cross-sectional shape defined by at least two different radii of curvature $R_c$, said rolling diaphragm having all local thicknesses t defined by the relationship $$D_R = \sqrt{R_c t} = K \text{ (constant)}$$

wherein $D_R$ is the rolling diameter of said rolling diaphragm, said rolling thickness $D_R$ being maintained at a uniform value K to assure stability of said rolling diaphragm under compression.

3. A piston-expulsion tank comprising:
   a tank shell having a cross-sectional shape defined by at least two different local radii of curvature;
   a piston moveably emplaced within said tank shell and having a cross-sectional shape substantially conforming to said cross-sectional shape of said tank shell;
   means for moving said piston within said tank shell;
   a rolling diaphragm set adjacent to interior surfaces of said tank shell and having one end securely attached to the periphery of said piston, said rolling diaphragm having local thicknesses t for maintaining a uniform rolling diameter in said rolling diaphragm as said piston is moved through said tank shell, all said local thicknesses t being varied in relationship to the local radii of curvature $R_c$ in accordance with the following equation:

$$D_R = \sqrt{R_c t} = K \text{ (constant)}$$

wherein $D_R$ is the rolling diameter of said rolling diaphragm which is maintained at a uniform value K.

4. A method of constructing a rolling diaphragm for use in a piston expulsion tank having a tank shell and piston with conforming cross-sectional shapes defined by at least two different local radii of curvature, said method comprising the step of varying all local thicknesses t of said rolling diaphragm in relationship with said local radii of curvature $R_c$ of said rolling diaphragm according to the following equation:

$$D_R = \sqrt{R_c t} = K \text{ (constant)}$$

wherein $D_R$ is the rolling thickness of said rolling diaphragm as said piston is moved through said tank, said rolling diameter $D_R$ being maintained at a uniform value K.

* * * * *